(«12») United States Patent
Kobayashi et al.

(10) Patent No.: US 9,200,393 B2
(45) Date of Patent: Dec. 1, 2015

(54) PROCESS OF MAKING A POLYMER FIBER

(75) Inventors: Hisatoshi Kobayashi, Tsukuba (JP);
Dohiko Terada, Tsukuba (JP)

(73) Assignee: NATIONAL INSTITUTE FOR MATERIALS SCIENCE, Ibaraki (JP)

(*) Notice: Subject to any disclaimer, the term of this patent is extended or adjusted under 35 U.S.C. 154(b) by 477 days.

(21) Appl. No.: 13/696,863

(22) PCT Filed: May 10, 2011

(86) PCT No.: PCT/JP2011/060758
§ 371 (c)(1),
(2), (4) Date: Jan. 4, 2013

(87) PCT Pub. No.: WO2011/142355
PCT Pub. Date: Nov. 17, 2011

(65) Prior Publication Data
US 2013/0109264 A1    May 2, 2013

(30) Foreign Application Priority Data

May 10, 2010   (JP) ................................ 2010-108171

(51) Int. Cl.
*D06M 10/00*  (2006.01)
*D04H 1/728*  (2012.01)
*D01D 5/00*  (2006.01)
*D01F 9/00*  (2006.01)
*B29C 47/00*  (2006.01)

(52) U.S. Cl.
CPC ............ *D04H 1/728* (2013.01); *B29C 47/0004* (2013.01); *B29C 47/0014* (2013.01); *B29C 47/0021* (2013.01); *D01D 5/0038* (2013.01); *D01F 9/00* (2013.01); *Y10T 428/298* (2015.01); *Y10T 442/626* (2015.04)

(58) Field of Classification Search
CPC .... D01D 5/003; D01D 5/0038; D01D 5/0046
USPC ............................ 264/10, 464, 465, 466, 484
See application file for complete search history.

(56) References Cited

U.S. PATENT DOCUMENTS

2013/0115457 A1\* 5/2013 Haynie et al. ............. 264/465 X

OTHER PUBLICATIONS

Geng, Xinying et al., "Electrospinning of chitosan dissolved in concentrated acetic acid solution," Mar. 19, 2005, Biomaterials 26 (2005), pp. 5427-5432.\*

\* cited by examiner

*Primary Examiner* — Leo B Tentoni
(74) *Attorney, Agent, or Firm* — Wenderoth, Lind & Ponack, L.L.P.

(57) ABSTRACT

A polymer electrolyte fiber having a high molecular weight is produced with ease by an electrospinning method. In an electrospinning method which comprises applying a voltage to a solution of a polymer electrolyte to allow a jet of the solution to spurt, forming a polymer fiber, the voltage applied to the solution of the polymer electrolyte is a voltage having the opposite polarity to the charge of molecular chains of the polymer electrolyte in the solution, and the voltage is applied to increase the viscosity of the solution to be higher than that of the solution before applying the voltage, allowing the solution to spurt.

4 Claims, 13 Drawing Sheets a) Droplet   b) Cone   c) Multijet

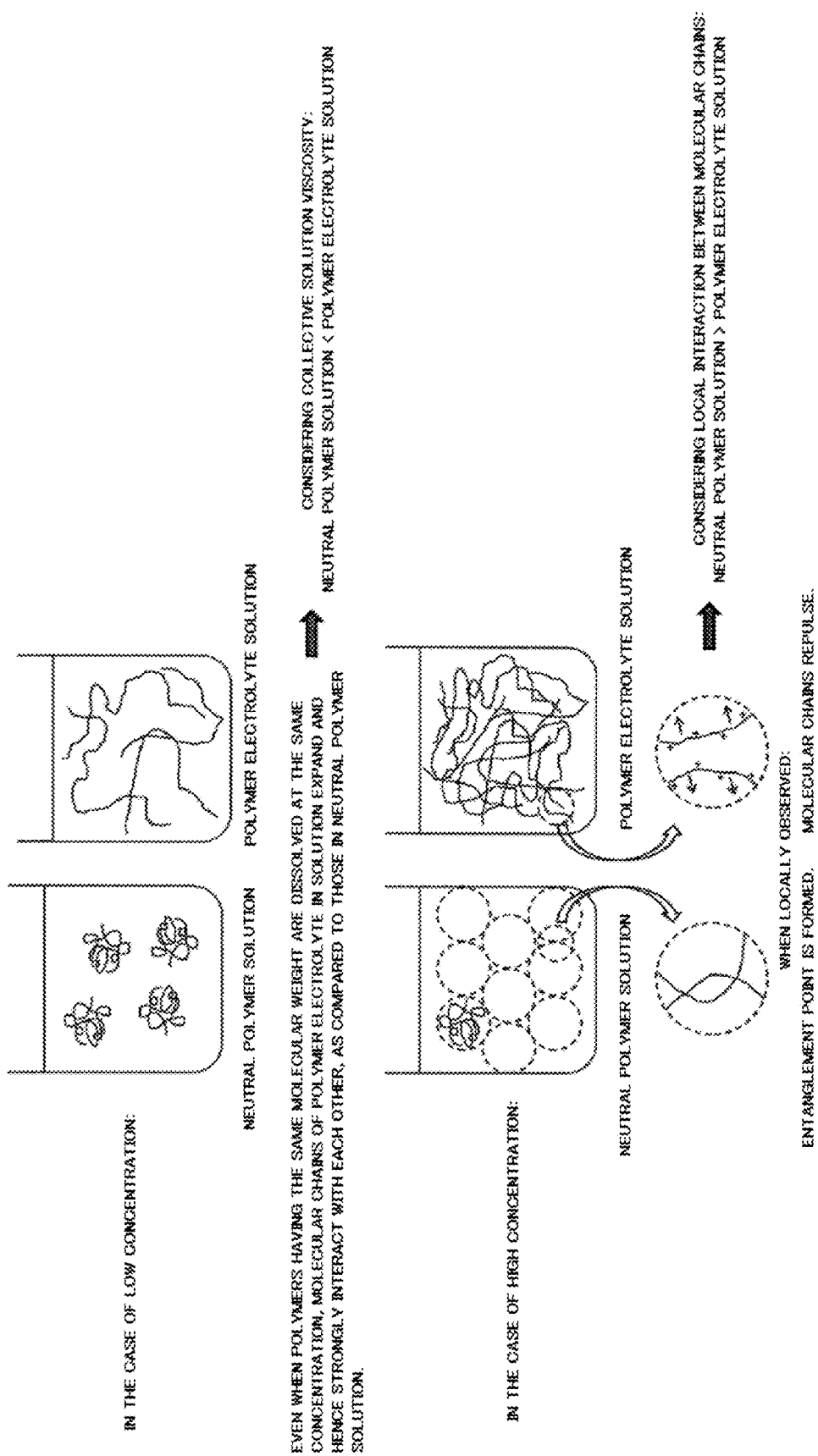

PROCESS OF MAKING A POLYMER FIBER

TECHNICAL FIELD

The present invention relates to a polymer fiber and a method for producing the same as well as an apparatus for producing the same.

BACKGROUND ART

As a method for forming a fiber comprising a polymer material and having an outer diameter on a nanometer scale, an electrospinning method has conventionally been known. This method is a method in which a jet of a polymer solution charged with a high voltage is allowed to spurt toward the ground or an electrode plate (collector) having the opposite charge to the jet, whereupon the solvent volatilizes to deposit a fiber.

Generally, a polymer solution is extruded at a constant speed through a thin needle, such as a syringe needle, and when an electrostatic repulsive force caused on the surface of the polymer solution by the voltage applied to the solution exceeds the surface tension of the polymer solution, a jet of the polymer solution spurts from a droplet at the needle tip. From the thus produced polymer fiber, a thin film of a three-dimensional structure having a space network can be formed, and a function that has never been seen in a film can be imparted to the thin film.

By the way, in recent years, chitosan as a polymer material has being drawing attention. Chitosan is an N-deacetylation product of chitin, which is (1→4)-β-D-glucosamine having a linear structure, and which is represented by the following formula.

[Chemical formula 1]

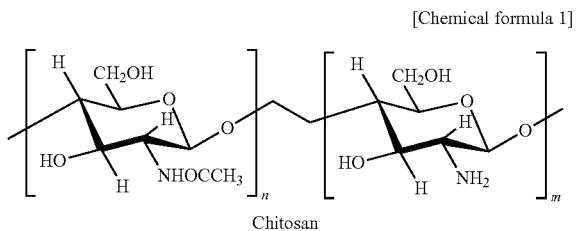

Chitosan

Chitosan is contained in shells of crustaceans, such as crabs and lobsters, and cell walls of mushrooms and the like, and biosynthesis of 100,000,000,000 tons (estimated) of chitosan occurs annually on the Earth simultaneously with biodegradation of chitosan, and thus chitosan is an abundant material of a recycling type. Utilizing excellent molecular functions of chitosan, chitosan is being put into practical use in various fields, e.g., the field of medical materials, the field of biotechnology, the field of foods, the field of agriculture, forestry, and fisheries, and the field of industry. For example, an attempt has been made to form a fiber of chitosan by the above-mentioned electrospinning method.

However, electrospinning of chitosan is generally difficult. The reason for this is that an acidic aqueous solution of high molecular-weight chitosan has high viscosity even when the concentration of the solution is low. The reason why the solution of chitosan has high viscosity even when the concentration of the solution is low resides in that chitosan inherently has a very high molecular weight (~1,000,000), and further resides in that chitosan is a polymer electrolyte having an amino group in the molecular chain thereof. As shown in the formula below, an amino group ($-NH_2$) is ionized ($-NH_3^+$) in water. Therefore, as shown in FIG. 12, electrostatic repulsion between the amino groups in the same molecular chain of chitosan causes the molecular chain to expand, so that the interaction between the adjacent molecular chains becomes stronger, increasing the viscosity of the solution.

[Chemical formula 2]

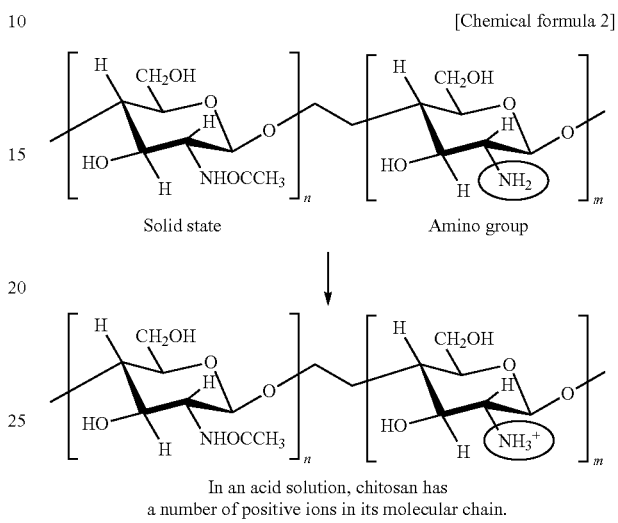

In an acid solution, chitosan has
a number of positive ions in its molecular chain.

For the above-mentioned reason, with respect to the balance between the solute concentration and the viscosity of a solution, there is a difference between a solution of a neutral polymer, which is not a polymer electrolyte, and a solution of a polymer electrolyte, such as chitosan, and this makes it difficult to electrospin the solution of a polymer electrolyte.

FIG. 13 shows a difference in the balance with respect to the low concentration and high concentration of a solution. From this, it is considered that the collective solution viscosity and the local interaction between branched chains with respect to the polymer electrolyte solution are totally different from those with respect to the neutral polymer solution.

There have been reported many methods for producing a fiber of chitosan by an electrospinning method, including non-patent documents 1 to 4. These methods can be roughly classified into the following three groups.

(1) A method in which a blend of chitosan and a synthetic polymer, such as polyethylene glycol or polyvinyl alcohol, is subjected to spinning.

In this method, the solution has a reduced chitosan content and the blended synthetic polymer makes up for the stringiness of the solution, enabling spinning of chitosan.

(2) A method in which electrospinning is conducted using a fluorine organic solvent (e.g., hexafluoro-2-propanol or trifluoroacetic acid).

In this method, a fluorine organic solvent having a lower viscosity and a lower surface tension as compared to an aqueous solvent is used to enable spinning of chitosan.

(3) A method in which a solution obtained by dissolving chitosan having a relatively low molecular weight (e.g., chitosan having a molecular weight of 100,000 or less) in concentrated acetic acid is subjected to electrospinning.

In this method, the use of low molecular-weight chitosan suppresses the increase of the viscosity of the solution due to entanglement of the molecular chains of chitosan, and the solution having a concentration as high as about 7 wt % makes up for the stringiness of the solution, and further the use of 90% concentrated acetic acid increases the charge density on the surface of the solution, thus enabling spinning of chitosan.

However, the methods of items (1) to (3) above have the following problems. Specifically, the chitosan nanofibers obtained by the method of item (1) above have a low chitosan content so that the properties of chitosan are not satisfactorily exhibited, and therefore the utilization of the obtained chitosan nanofibers in medical applications including the use as a wound bandaging material, environmental applications including the use as an ion-exchange filter, and the like is limited. The fluorine organic solvent used in the method of item (2) above is highly toxic to a human body and causes large loads on the environment, and further is expensive, and therefore industrial manufacturing of chitosan nanofibers using this method is difficult. The method of item (3) above is disadvantageous not only in that a further step for obtaining low molecular-weight chitosan is needed, but also in that the reduction of the molecular weight generally causes the physical properties of fibers to be poor.

Non-patent document 1: Morphological and Surface Properties of Electrospun Chitosan Nanofibers; Biomacromolecules 2008, 9, 1000-1006.

Non-patent document 2: Electrospinning of chitosan nanofibers: Degradation behavior and cellular response to normal human keratinocytes and fibroblasts; Biomaterials 2006, 27, 3934-3944.

Non-patent document 3: Electrospinning of chitosan dissolved in concentrated acetic acid solution; Biomaterials 2005, 26, 5427-5432.

Non-patent document 4: Electrospinning of Chitosan; Macromolecular Rapid Communications 2004, 25, 1600-1605.

DISCLOSURE OF INVENTION

Problems that the Invention is to Solve

In view of the above problems, an object of the present invention is to provide a method and an apparatus for producing a polymer fiber, which can produce with ease a fiber of a high molecular-weight polymer electrolyte, such as chitosan, and a novel polymer fiber.

Means for Solving the Problems

For achieving the above object, the method for producing a polymer fiber of the invention is a method for producing a polymer fiber by an electrospinning method which comprises applying a voltage to a solution of a polymer electrolyte to allow a jet of the solution to spurt, forming a polymer fiber, wherein the voltage applied to the solution of the polymer electrolyte to allow the solution to spurt is a voltage having the opposite polarity to the charge of molecular chains of the polymer electrolyte in the solution. In this method, the properties of the polymer electrolyte ionized in the solution are locally and temporarily changed to properties close to those of a neutral polymer, enabling the production of a polymer fiber by an electrospinning method.

In the method for producing a polymer fiber, it is preferred that the polymer electrolyte is at least any one of naturally derived polymers (chitosan, hyaluronic acid, polyglutamic acid, nucleic acid, polypeptide, protein, cellulose, and derivatives thereof).

In the method for producing a polymer fiber, it is preferred that the polymer electrolyte is at least any one of synthetic polymers (polyacrylamide, polyacrylic acid, polystyrenesulfonic acid, polyallylamine, and polyethylene-imine).

In the method for producing a polymer fiber, it is preferred that the polymer electrolyte is a blend (mixture) having as a component at least one polymer electrolyte selected from naturally derived polymers (chitosan, hyaluronic acid, polyglutamic acid, nucleic acid, polypeptide, protein, cellulose, and derivatives thereof) and synthetic polymers (polyacrylamide, polyacrylic acid, polystyrenesulfonic acid, polyallylamine, and polyethylene-imine).

The polymer fiber of the invention comprises chitosan having a viscosity-average molecular weight of 70,000 to 1,000,000 and an average fiber diameter of 56 to 94 nm.

In the method for producing a polymer fiber, it is preferred that the polymer fiber does not contain beads or a particulate deposited material.

In the method for producing a polymer fiber, it is preferred that the standard deviation of the average fiber diameter is 40 nm or less.

The nonwoven fabric of the invention comprises the above-mentioned polymer fiber.

The apparatus for producing a polymer fiber of the invention comprises:

a nozzle for allowing a polymer electrolyte solution to spurt;

feeding means for feeding the polymer electrolyte solution to the nozzle;

a high voltage generating apparatus for applying to the nozzle a voltage having the opposite polarity to the charge of molecular chains of the polymer electrolyte in the polymer electrolyte solution; and an electrode plate for collecting a polymer fiber formed from the solution spurted from the nozzle.

In the apparatus for producing a polymer fiber, it is preferred that the high voltage generating apparatus is capable of applying at least one type of voltage selected from a constant voltage, a sinusoidal voltage, and a rectangular voltage.

It is preferred that the apparatus for producing a polymer fiber comprises a multi-nozzle having a base plane to which the voltage from the high voltage generating apparatus is applied, and having a plurality of the nozzles which protrude from the base plane and which are electrically conducted to the base plane.

Advantage of the Invention

In the invention, by applying a voltage having the opposite polarity to the charge of molecular chains of the polymer electrolyte in the solution to the solution of the polymer electrolyte, the properties of the electrolyte polymer ionized in the solution are changed, so that the physical properties of the solution can be changed. Thus, the droplet of the solution formed at the needle tip is changed in shape into a cone, and a jet of the solution spurts only from the pointed end of the cone, making it possible to form a polymer fiber containing almost no particle. Even when a solution having a low concentration is used, the apparent viscosity of the solution is increased to enable the formation of a polymer fiber containing almost no particle.

BRIEF DESCRIPTION OF DRAWINGS

FIG. 13 Diagrammatic view explaining the interaction between chitosan molecular chains when the concentration is low and when the concentration is high.

MODE FOR CARRYING OUT THE INVENTION

Hereinbelow, an embodiment of the present invention will be described.

In the method for producing a polymer fiber according to the present embodiment, a conventionally known electrospinning method is employed.

Figure 1:
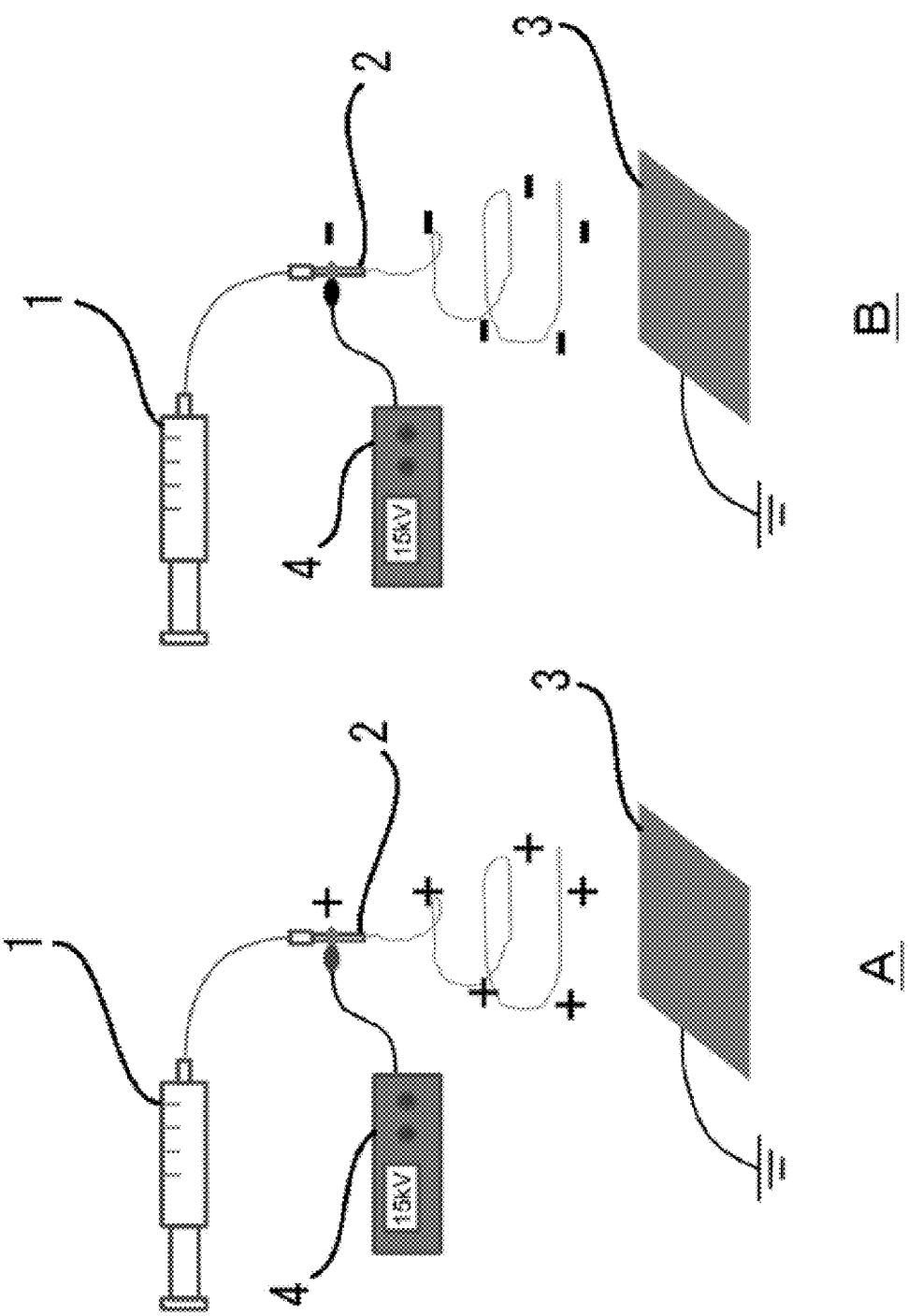
FIG. 1 Views diagrammatically showing an embodiment of the apparatus for producing a polymer fiber.

In the electrospinning method, a high voltage is applied to a polymer electrolyte solution to allow a jet of the solution to spurt, forming a polymer fiber which is a fiber formed from the polymer electrolyte. An apparatus for electrospinning can have various constructions from conventional findings. Basically, as shown in FIG. 1, the apparatus comprises feeding means for feeding a polymer electrolyte solution, e.g., a syringe pump 1, a needle 2 (nozzle: start point of spinning) for allowing the fed polymer electrolyte solution to spurt, an electrode plate 3 (collector) for collecting a polymer fiber formed, and a high voltage generating apparatus 4 for applying a high voltage to the needle 2. The high voltage generating apparatus 4 is capable of applying a positive voltage (FIG. 1A) or a negative voltage (FIG. 1B) to the needle 2.

In the electrospinning method, as mentioned above, by applying a voltage to the polymer electrolyte solution, charges are induced and accumulated on the surface of the solution, and, when the repulsive force within the charges exceeds the surface tension of the solution, a jet of the charged solution spurts. The spurting jet of the solution becomes a thinner jet due to evaporation of the solvent, and is finally collected as a polymer fiber by the collector. The diameter of the collected polymer fiber can be controlled by appropriately selecting the concentration of the polymer electrolyte solution, applied voltage, spinning distance, and the like, and, for example, a nanofiber having a diameter on a nanometer scale (<100 nm) or a microfiber having a diameter on a micrometer scale (<100 μm) can be obtained. In the invention, a nanofiber of a high molecular-weight polymer electrolyte having a diameter of about 50 to 500 nm can be formed.

Figure 2:
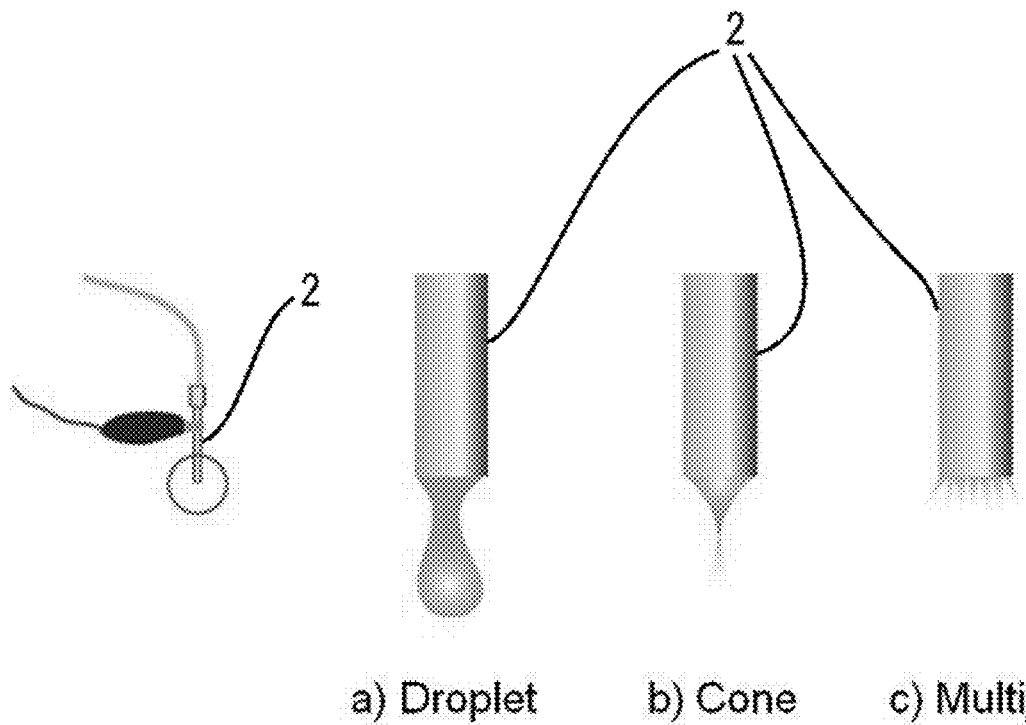
FIG. 2 Diagrammatic view explaining the state of the solution at a needle tip during the electrospinning.

The state of the solution at a needle tip during the electrospinning can be roughly classified into three types according to the viscosity of the solution. When the solution concentration is high, that is, the viscosity of the solution is high, as shown in a) of FIG. 2, a droplet merely falls from the tip of the needle 2, making it impossible to spin a polymer fiber. On the other hand, when the solution concentration is low, that is, the viscosity of the solution is low, as shown in c) of FIG. 2, a number of jets of the solution (Multijet) spurt. Spinning of a polymer fiber is possible, but, when the solution having a low concentration is used, that is, the amount of the polymer contained in the jet is small, a number of particles are disadvantageously formed simultaneously with a fiber. When the solution has an appropriate concentration, as shown in b) of FIG. 2, the droplet of the solution formed at the tip of the needle 2 is changed in shape into a cone, and a jet of the solution spurts only from the pointed end of the cone, making it possible to spin a polymer fiber containing almost no particle.

For spinning a polymer fiber containing almost no particle, it is important that a solution having an appropriate concentration is prepared as described above, but, in the production of a fiber of a polymer electrolyte, it is not easy to control the solution of the polymer electrolyte to have both an appropriate concentration and an appropriate viscosity. The reason for this is that the relationship between the concentration and the physical properties of the polymer electrolyte solution is different from that of a solution of a neutral polymer having no charge in the molecular chain.

Figure 12:
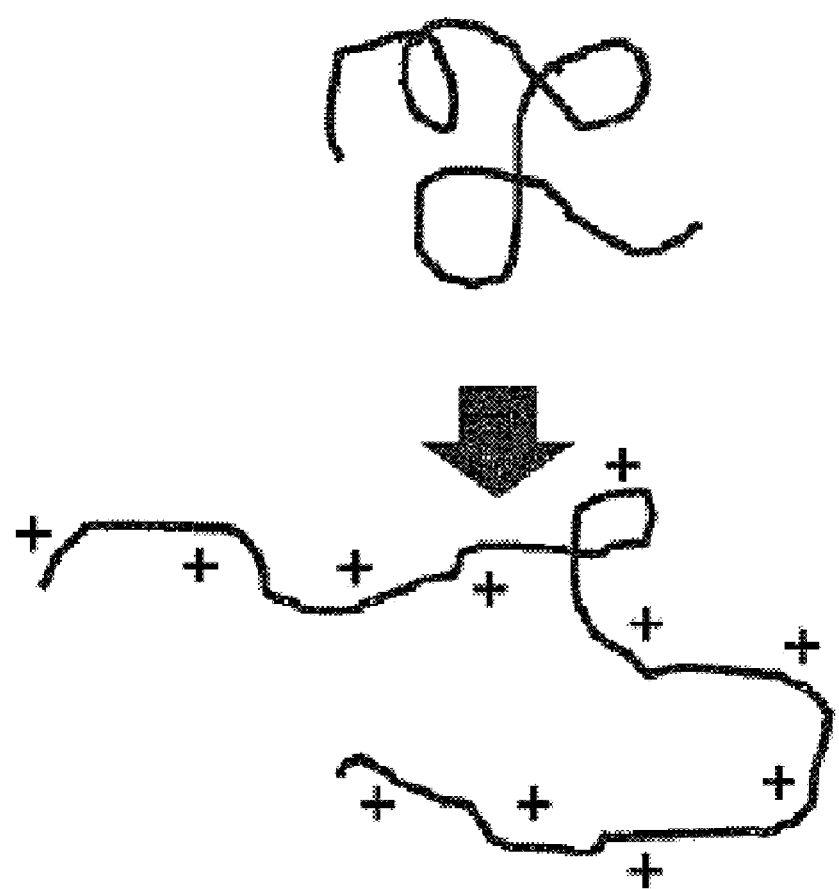
FIG. 12 Diagrammatic view explaining the behavior of a chitosan molecular chain.

An electrospinning apparatus on a laboratory level is generally operated at an applied voltage of up to about +30 kV in air at room temperature under atmospheric pressure. When a voltage accompanied by no danger of discharge is applied to the polymer solution while controlling the environment conditions on a laboratory level including the temperature, humidity, and pressure, for allowing a jet of the polymer solution to spurt, the physical properties of the solution (viscosity, surface tension ∝ concentration) must be a certain upper limit (A) or less. On the other hand, for spinning a uniform continuous fiber containing no bead and no particle, the concentration of the solution must be a certain lower limit (B) or more. In other words, for spinning a nanofiber by an electrospinning method, the concentration of the solution must fall in the range: B<concentration <A. However, for the reason of the above-mentioned properties of the polymer electrolyte, for example, with respect to the high molecular-weight chitosan solution, as shown in FIGS. 12 and 13, even when the chitosan solution has a very low concentration, the molecular chains of chitosan in the solution expand, so that the interaction between the adjacent molecular chains causes the viscosity of the solution to be increased.

Therefore, the lower limit concentration (B) of the solution required for spinning a uniform continuous fiber containing no bead and no particle exceeds the upper limit (A) required for electrospinning (that is, A<B), and thus spinning of a high molecular-weight chitosan solution using an ordinary apparatus on a laboratory level is difficult. Even when a jet is allowed to spurt from a low concentration solution (=low viscosity, low surface tension), electrostatic repulsion between the molecular chains is likely to cause the jet to be unstable, so that beads or particles are easily formed, making it difficult to obtain a uniform continuous fiber.

Figure 3:
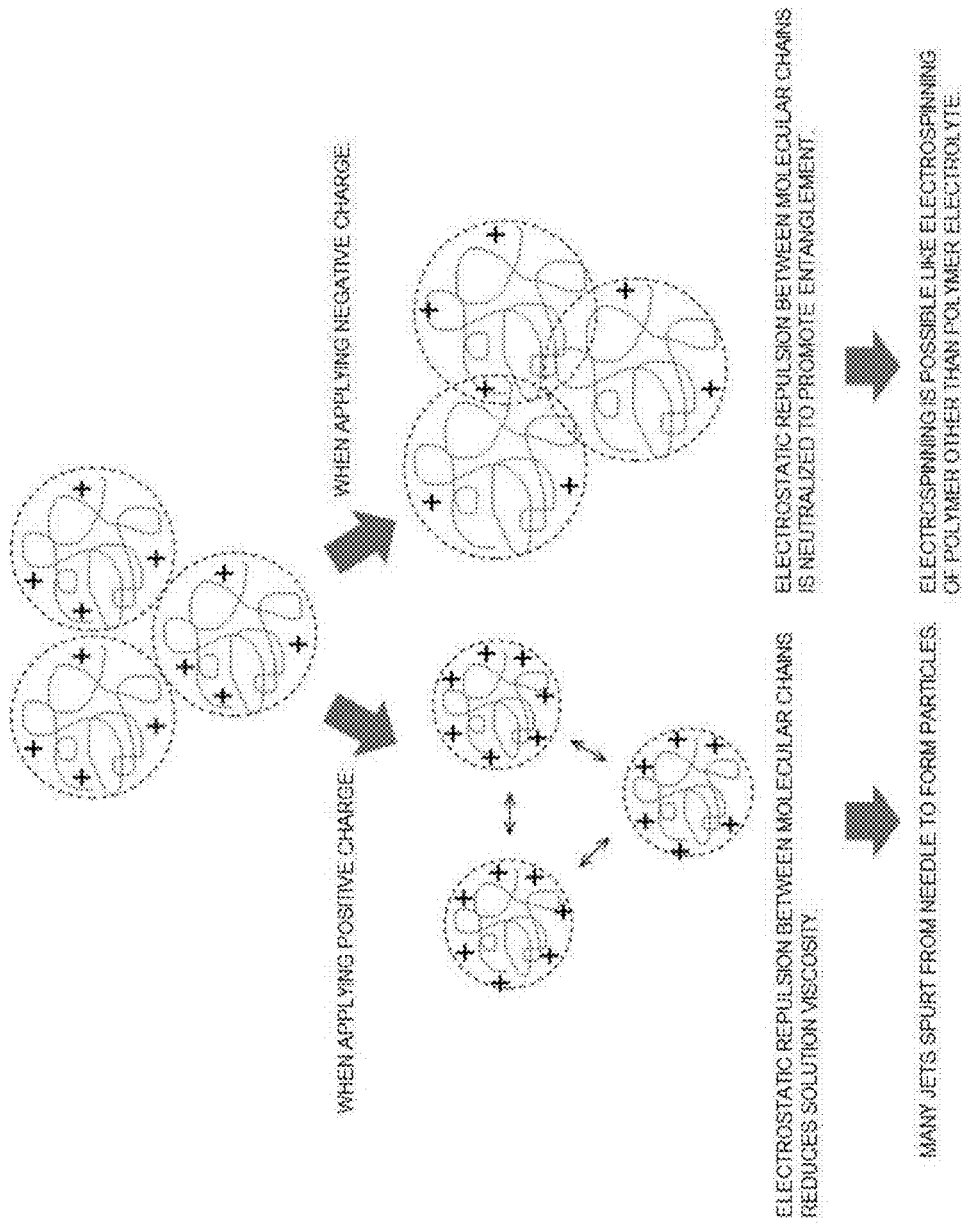
FIG. 3 Diagrammatic view explaining the behavior of molecular chains when a voltage is applied to an aqueous chitosan solution.

Further, in the electrospinning method, generally, a positive charge, which is unlikely to cause spark discharge, is applied to the spinning solution. In this case, electrons are abstracted from the spinning solution, so that the solution is positively charged. When chitosan is used as the polymer electrolyte, the application of a positive charge promotes positively charging of chitosan molecular chains to enhance electrostatic repulsion between the chitosan molecular chains in the solution. For this reason, as compared to a high concentration solution having the same concentration of a neutral polymer having the same molecular weight, as shown in FIG. 13, the local interaction between the molecular chains in the high concentration solution of the polymer electrolyte is reduced due to the electrostatic repulsion. Consequently, as shown in the figure on the left-hand side of FIG. 3, a number of jets of the solution shown in c) of FIG. 2 spurt from the needle tip during the electrospinning to form a polymer fiber containing a number of particles.

On the other hand, by applying a negative charge to the aqueous chitosan solution, namely, feeding electrons to the solution from the high voltage generating apparatus, the positive charge of the ionized amino groups is neutralized to reduce the electrostatic repulsion between the chitosan molecular chains. Therefore, as seen in a polymer other than the polymer electrolyte, the entanglement effect between the molecular chains is increased, and even a low concentration solution (for example, 2 wt % or less solution) is increased in the apparent viscosity, making it possible to suppress the formation of particles and to form a nanofiber (figure on the right-hand side of FIG. 3). The invention has been made based on the above finding. Specifically, in the electrospinning of a polymer electrolyte, by applying to the polymer electrolyte a high voltage having the opposite polarity to the charge of molecular chains of the polymer electrolyte, the properties of the polymer electrolyte ionized in the solution are changed, and thus the viscosity of the solution can be easily controlled to be appropriate without changing the concentration, so that a jet of the solution can spurt only from the pointed end of the cone-shaped droplet formed at the needle tip, enabling the formation of a polymer fiber containing almost no particle. Electrospinning of chitosan is generally considered difficult, but, in the invention, a fiber containing chitosan as a single component can be produced with ease utilizing a conventional apparatus.

The high voltage generating apparatus 4 can not only apply a constant voltage but also control the voltage to be a sinusoidal or rectangular voltage. By virtue of this, a fiber diameter variation on a nanometer scale continuing in the length direction can be imparted to the fiber to be spun, or a nonwoven fabric of a short fiber having a relatively narrow fiber length distribution can be formed.

Figure 4:
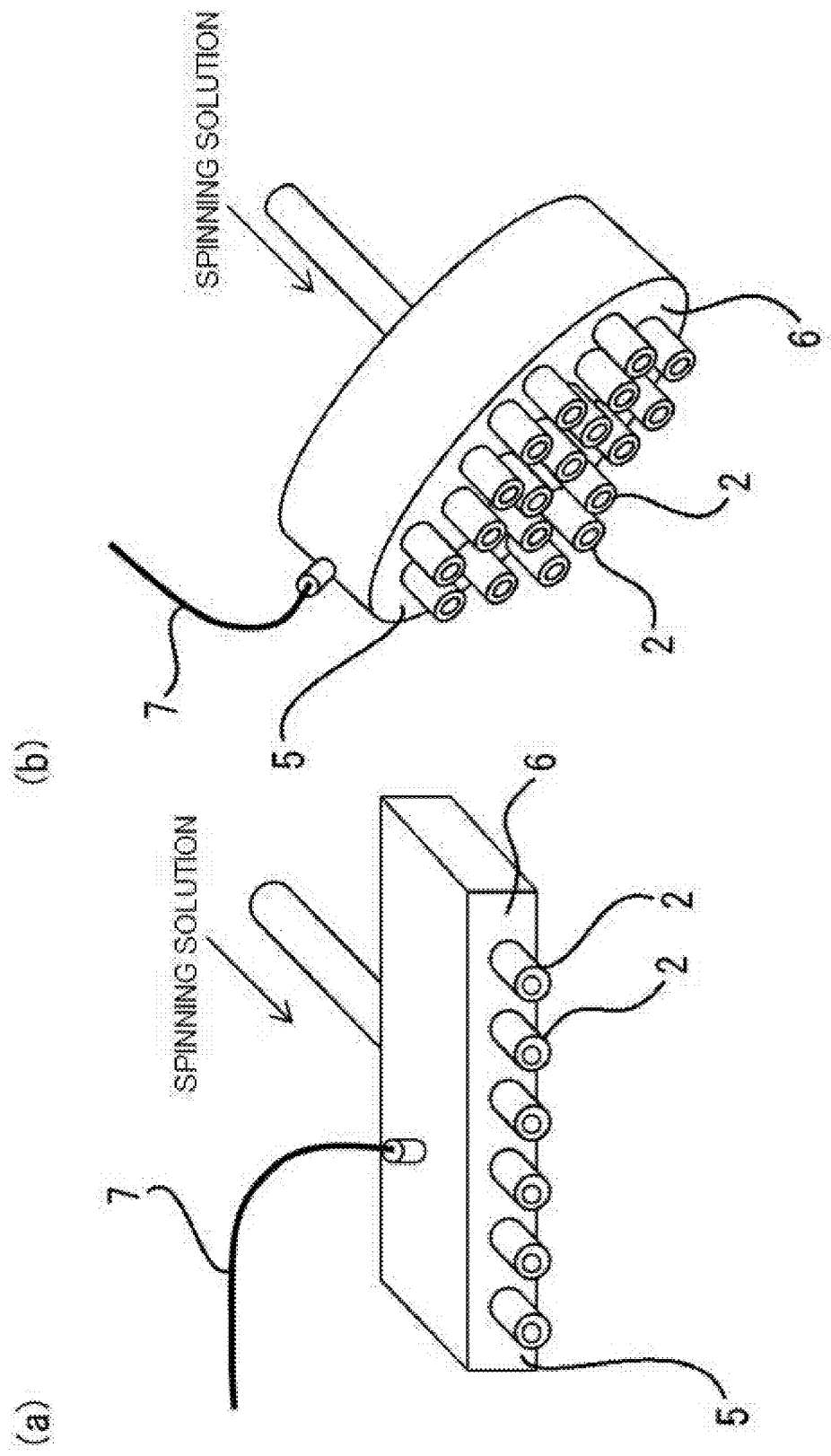
FIG. 4 Views diagrammatically showing another embodiment of the apparatus for producing a polymer fiber.

As shown in FIG. 4, as a spinning nozzle for electrospinning, a multi-nozzle 5 can be used. In the present embodiment, the nozzle tip of the multi-nozzle 5 protrudes 1 mm or more from a base plane 6, and the nozzle interval is 10 mm. The arrangement of the multi-nozzle 5 can be linear rows as shown in (a) or a disk form as shown in (b). The individual nozzles 2 and the base plane 6 are electrically conducted to each other, and a voltage for electrospinning is applied to the base from a not shown high voltage generating apparatus 4 through a high-voltage cable 7, so that the voltage is applied to the spinning solution discharged from the individual nozzles 2.

Chitosan is a polysaccharide obtained by subjecting to deacetylation chitin obtained from a crustacean, such as crab or lobster, an insect, a shellfish, a mushroom, or the like, and there are three types of chitosan, i.e., an α type, a β type, and a γ type according to the molecular crystal structures of chitin, and chitosan using chitin having any of the structures may be used. The molecular weight of chitosan ranges from, for example, 300,000 to 1,000,000 or more depending on the method for producing chitosan, but there is no particular limitation in the invention. When chitosan has a large molecular weight, the solubility is lowered, and there are problems of the solution concentration and viscosity and the spinning properties, and the formation of a polymer fiber containing almost no particle from chitosan having a large molecular weight has conventionally been difficult. However, in the invention, such a polymer fiber can be easily formed even from high molecular-weight chitosan having, for example, a viscosity-average molecular weight of 600,000 or more.

Particularly, by the method of the invention, a novel polymer fiber comprising chitosan having a viscosity-average molecular weight of 70,000 to 1,000,000 and an average fiber diameter of 56 to 94 nm is provided. In a preferred embodiment, the polymer fiber does not contain beads or a particulate deposited material, and the standard deviation of the average fiber diameter is 40 nm or less.

The novel polymer fiber is a chitosan fiber which has a high molecular weight and a small fiber diameter, and which has never conventionally existed. This novel polymer fiber can provide a high molecular-weight chitosan material having a large surface area, and is preferably used in a nonwoven fabric and the like.

With respect to the polymer electrolyte as a solute to which the invention is applied, there is no particular limitation as long as the polymer electrolyte is dissolved in a solvent so that the molecular chains of the polymer electrolyte are ionized, and examples of the polymer electrolytes include chitosan, hyaluronic acid, polyglutamic acid, nucleic acid, and protein. In each of these polymer electrolytes, a part of the principal chain or side chain is ionized in an aqueous solution, so that the polymer electrolyte is dissolved, and electrostatic repulsion between the molecular chains having the same charge keeps the dispersion state stable. When an electrolyte, such as sodium chloride, is added to an aqueous solution of the polymer electrolyte, the stability of the dispersion state immediately deteriorates to cause the polymer electrolyte to suffer coagulation (so-called salting out). In other words, the interaction between the molecular chains of the polymer electrolyte in the solution is caused by the electrostatic interaction between the ionized principal chains or side chains, and, by utilizing this property, the application of a high voltage from the outside makes it possible to control the interaction between the molecular chains. In this case, it is expected that, by applying a high voltage having the opposite polarity to the charge of the molecular chains, the electrostatic repulsion between the molecular chains on the surface of the charged solution is temporarily suppressed to enhance the interaction like salting out, enabling electrospinning like electrospinning of chitosan.

Examples of solvents include water, ethanol, methanol, formic acid, acetic acid, sulfuric acid, hydrochloric acid, and nitric acid. Chitosan is hardly dissolved in water and hence, when chitosan is used as a polymer electrolyte, an organic acid, such as formic acid or acetic acid, or an inorganic acid, such as hydrochloric acid or nitric acid, can be used.

The concentration of the polymer electrolyte in the solution varies depending on the polymer electrolyte used, but the concentration can be, for example, 0.8 to 20 wt %. When the concentration is more than 20 wt %, the viscosity of the solution becomes extremely high, making it difficult to obtain an intended fiber.

The voltage applied to the solution of the polymer electrolyte can be, for example, about 5.0 to 30 kV. Needless to say, a voltage having the opposite polarity to the charge of molecular chains of the polymer electrolyte is applied. The spinning distance can be, for example, about 5.0 to 50 cm. The voltage and spinning distance are not limited to those mentioned above, and conditions are appropriately selected according to the polymer electrolyte, solvent, and apparatus used.

Hereinabove, the invention has been described with reference to the embodiment, but the invention is not limited to the above-described embodiment, and can be changed or modified as long as the effects of the invention can be obtained.

EXAMPLES

Hereinbelow, the present invention will be described in more detail with reference to the following Examples, which should not be construed as limiting the scope of the invention.

Example 1

Polymer fibers were produced using the apparatus shown in FIG. 1. Samples, each of which is chitosan as a solute, a solvent, and spinning conditions are as follows.
Sample
  Chitosan A: viscosity-average molecular weight: 700,000 g/mol; deacetylation degree: 88%
  Chitosan B: viscosity-average molecular weight: 640,000 g/mol; deacetylation degree: 95%
  Chitosan C: viscosity-average molecular weight: 1,000,000 g/mol; deacetylation degree: 80 to 90%
Solvent: 90% Acetic acid
Spinning Conditions
  Solution concentration: 0.8 to 2 wt %
  Distance between needle and collector: 5 to 10 cm
  Voltage: −20 to −15 kV, +15 to +20 kV
  Feeding rate: 0.25 to 0.5 ml/h
  Humidity: 20 to 30%
  Needle: 22 G The measurement of a viscosity-average molecular weight was conducted using an Ubbelohde viscometer. Chitosan was dissolved in a mixed solvent comprising 0.2 M acetic acid, 0.1 M sodium chloride, and 4 M urea to prepare solutions having respective concentrations of 0.4, 0.2, 0.1, 0.05, and 0.025 wt %. An intrinsic viscosity [h] was determined from the values of viscosity measured at 25° C. with respect to the individual solutions, and a viscosity-average molecular weight M was determined by making a calculation using a Mark-Houwink-Sakurada's viscosity equation (Formula 1). In the formula below, constants K and $\alpha$ were $8.93 \times 10^{-2}$ cm$^3$/g and 0.71, respectively.

$$[\eta] = KM^{\alpha} \qquad \text{(Formula 1)}$$

Figure 5:
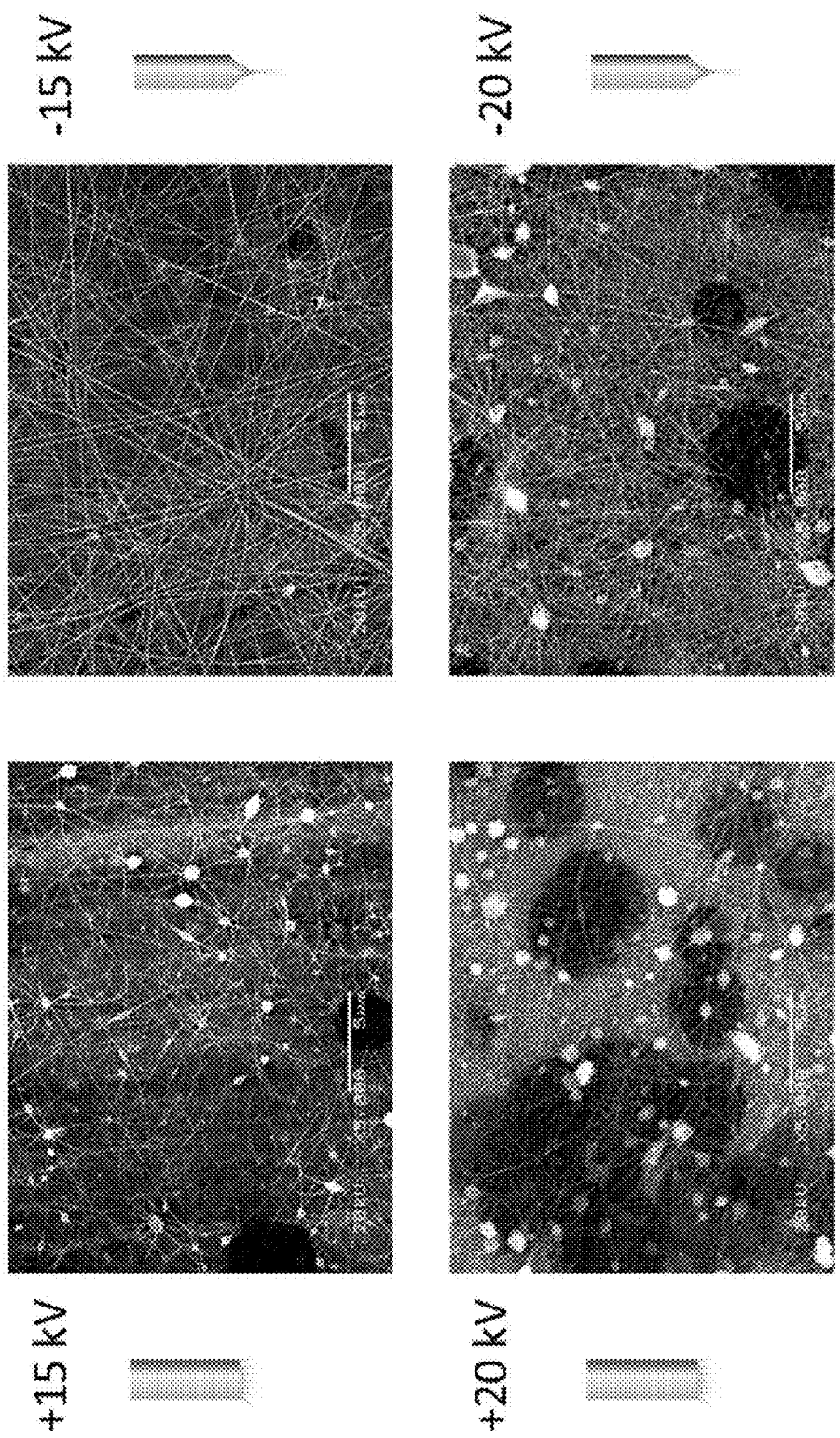
FIG. 5 Photographs of the polymer fibers produced using chitosan A in Example 1.
Figure 6:
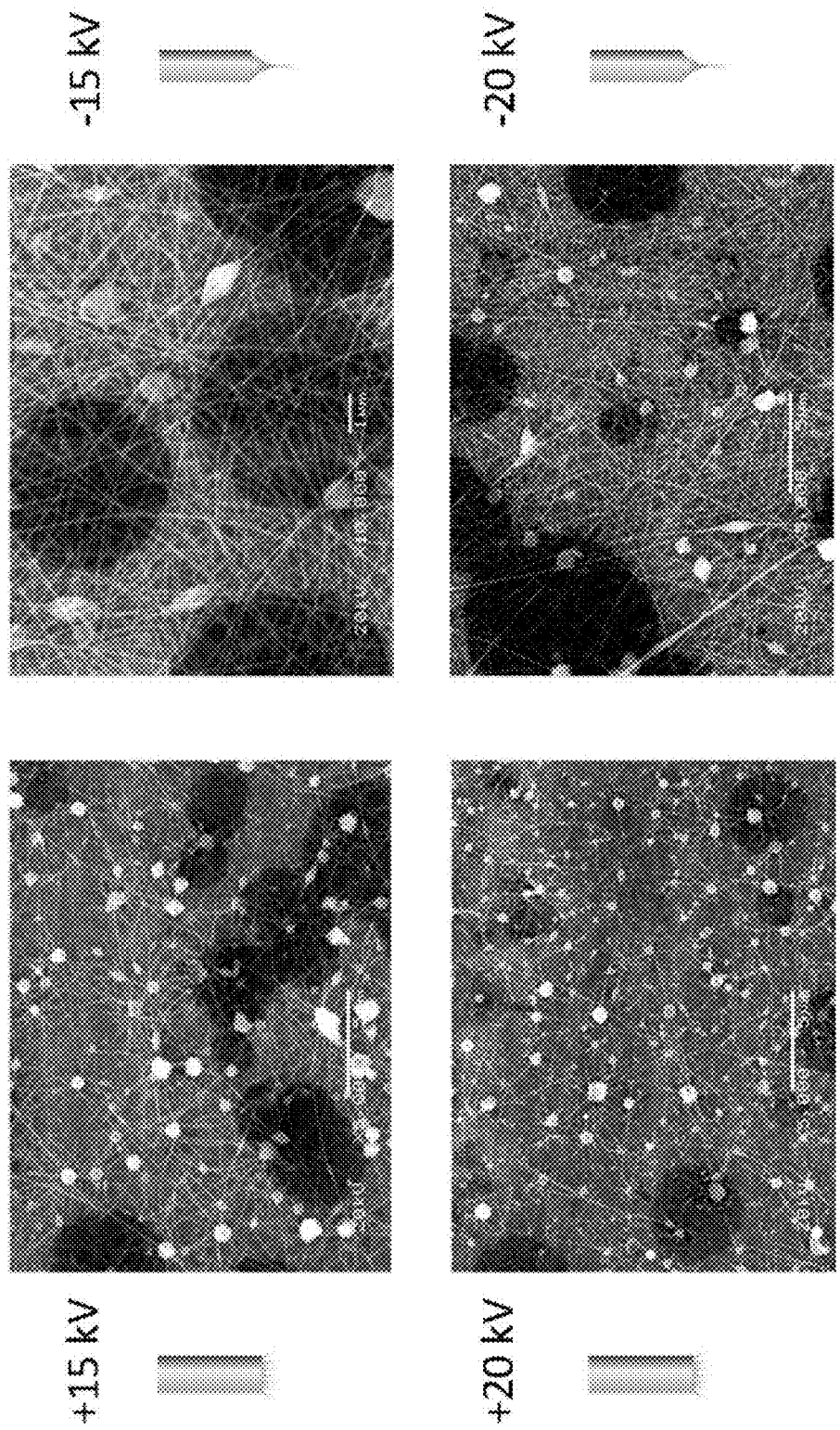
FIG. 6 Photographs of the polymer fibers produced using chitosan B in Example 1.
Figure 7:
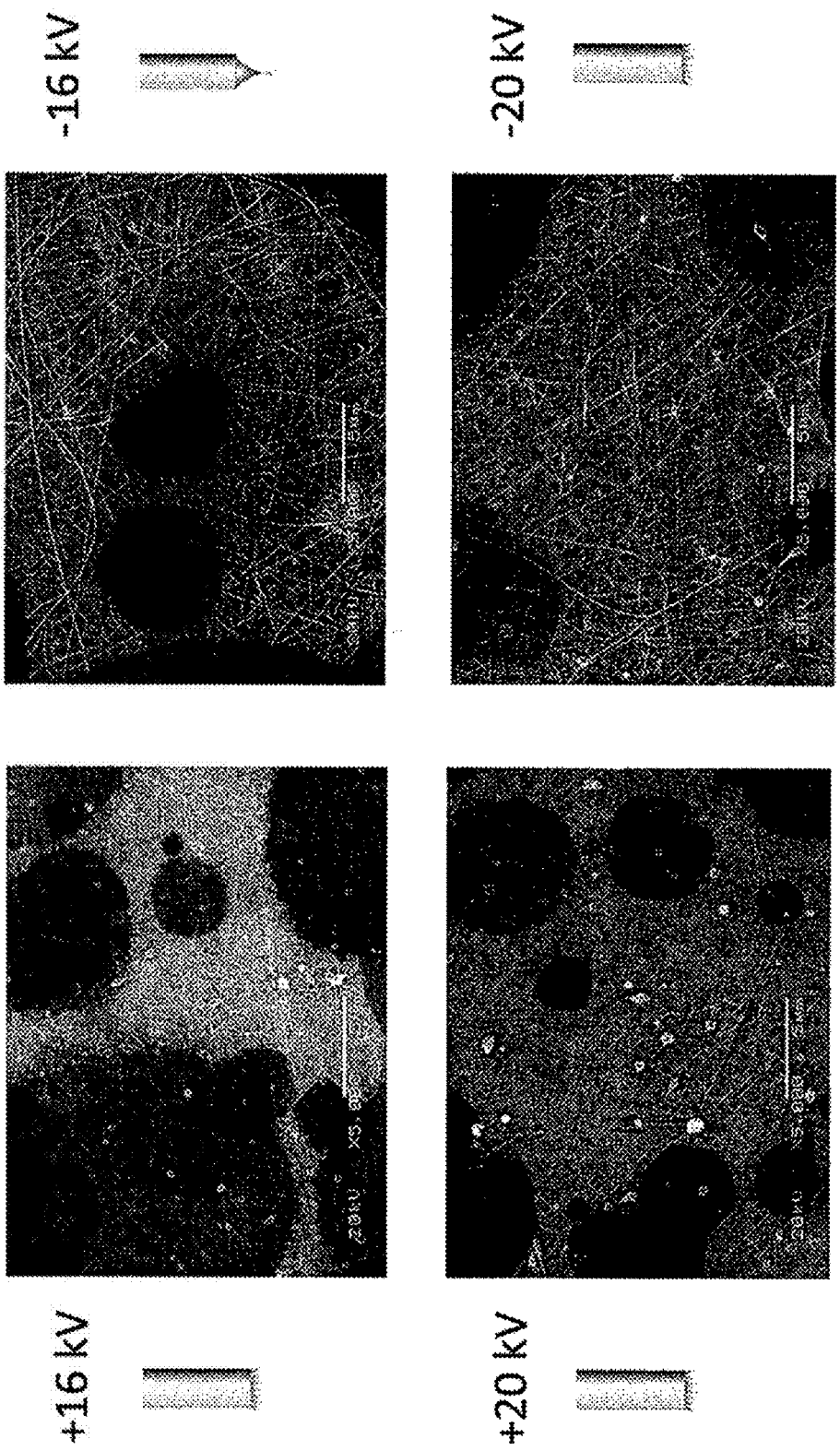
FIG. 7 Photographs of the polymer fibers produced using chitosan C in Example 1.

FIG. 5 shows photographs of the polymer fibers produced using chitosan A, FIG. 6 shows photographs of the polymer fibers produced using chitosan B, and FIG. 7 shows photographs of the polymer fibers produced using chitosan C. Further, in each of FIGS. 5, 6, and 7, the left-hand figures individually show polymer fibers produced by electrospinning at a positive voltage, and the right-hand figures individually show polymer fibers produced by electrospinning at a negative voltage.

From FIGS. 5, 6, and 7, it is found that when a positive voltage is applied to the solution of chitosan, a number of particles are formed. It is found that, on the other hand, when a voltage having the opposite polarity to the charge of molecular chains of chitosan, i.e., a negative voltage is applied to the solution, the formation of particles are suppressed, as compared to the formation of particles when a positive voltage is applied, so that a polymer fiber is effectively formed.

Figure 8:
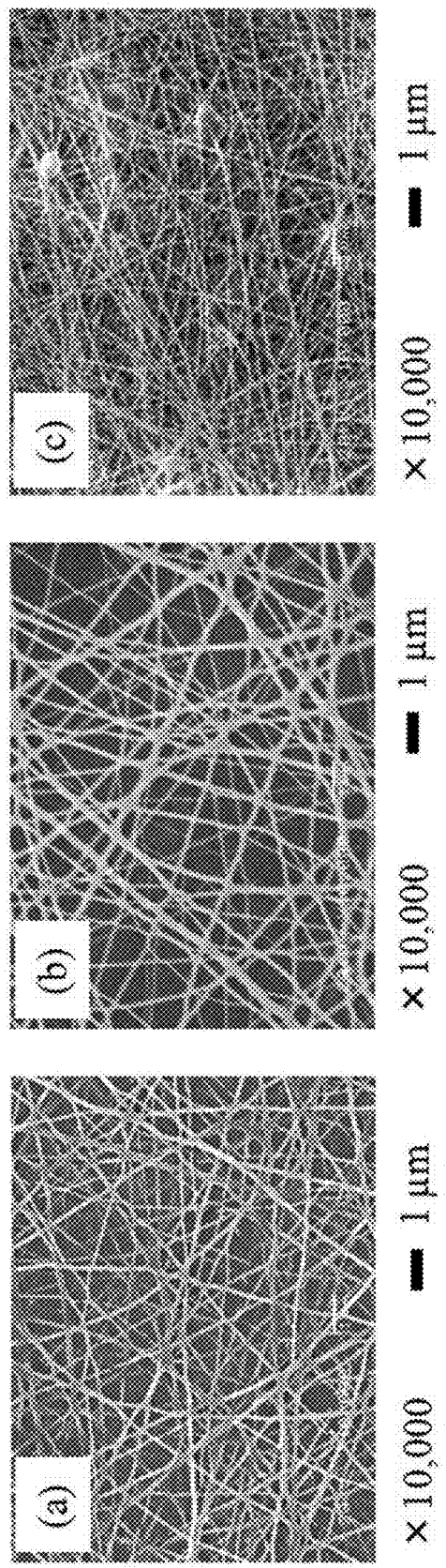
FIG. 8 Photographs of the polymer fibers produced using chitosan A in Example

FIG. 8 shows photographs of the polymer fibers produced when a negative voltage is applied to the solution of chitosan A. The production conditions, and average diameters of the produced polymer fibers and standard deviations of the average diameters are shown in Table 1 and Table 2, respectively.

The average fiber diameter was determined as an average of the diameters of the fibers (n=30) arbitrarily extracted from the photographs.

TABLE 1

| Sample code | Applied voltage, kV | Distance, mm | Feeding rate, ml/h | Humidity, % | Needle, gauge |
| --- | --- | --- | --- | --- | --- |
| a | 15.0 | 100 | 0.25 | 20 | 22 |
| b | 10.0 | 50 | 0.25 | 15 | 22 |
| c | 15.0 | 50 | 0.25 | 20 | 22 |

TABLE 2

| Sample code | Ave. diameter, nm (n = 30) | Standard deviation, nm (n = 30) |
| --- | --- | --- |
| a | 84 | 24 |
| b | 94 | 39 |
| c | 56 | 26 |

From the above results, it is found that the obtained polymer fibers are nanofibers having an average diameter of 50 to 100 nm.

Example 2

Figure 9:
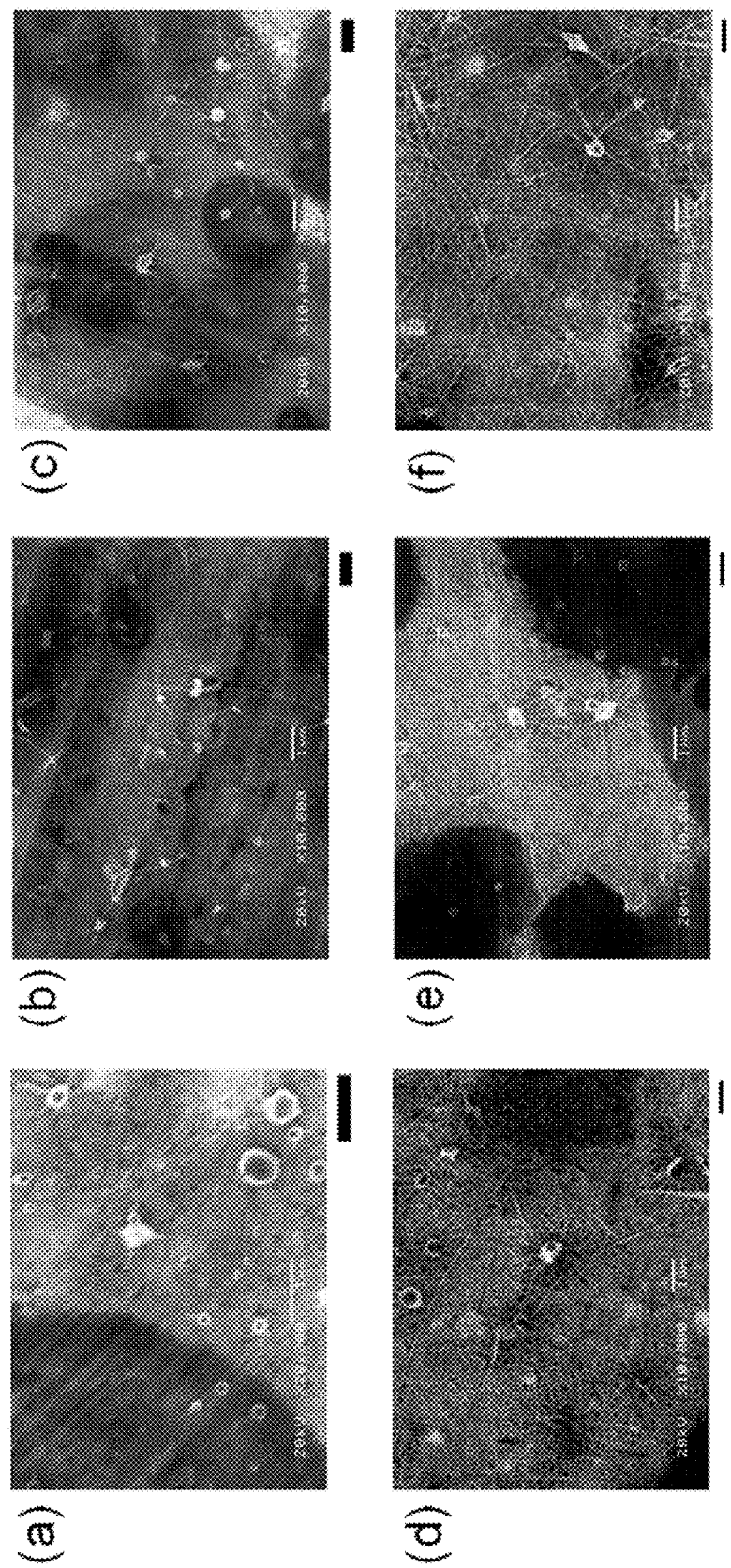
FIG. 9 Photographs showing the results of spinning conducted when the applied voltage is +16 kV in Example 2. Solution concentration: (a) 3.0 mg/ml; (b) 4.0 mg/ml; (c) 5.0 mg/ml; (d) 6.0 mg/ml; (e) 8.0 mg/ml; (f) 10.0 mg/ml.

Using chitosan having a viscosity-average molecular weight of 1,000,000 g/mol and a deacetylation degree of 80 to 90%, the effect of the solution concentration on the formation of fiber was examined. The results of spinning conducted when the applied voltage was +16 kV and constant and the solution concentration was changed in the range of from 3.0 to 10.0 mg/ml are shown in FIG. 9. The feeding rate and the spinning distance were 3.0 ml/h and 50 mm, respectively. When the solution concentration was 3.0 mg/ml, only a particulate deposited material was formed. When the solution concentration was 4.0 mg/ml, a deposited material having a fibrous continuous structure was observed, and as the solution concentration was increased, the fibrous structure of the deposited material became definite. However, in any solution concentrations, the deposited material contained beads, and a non-defective fiber was not able to be obtained.

Figure 10:
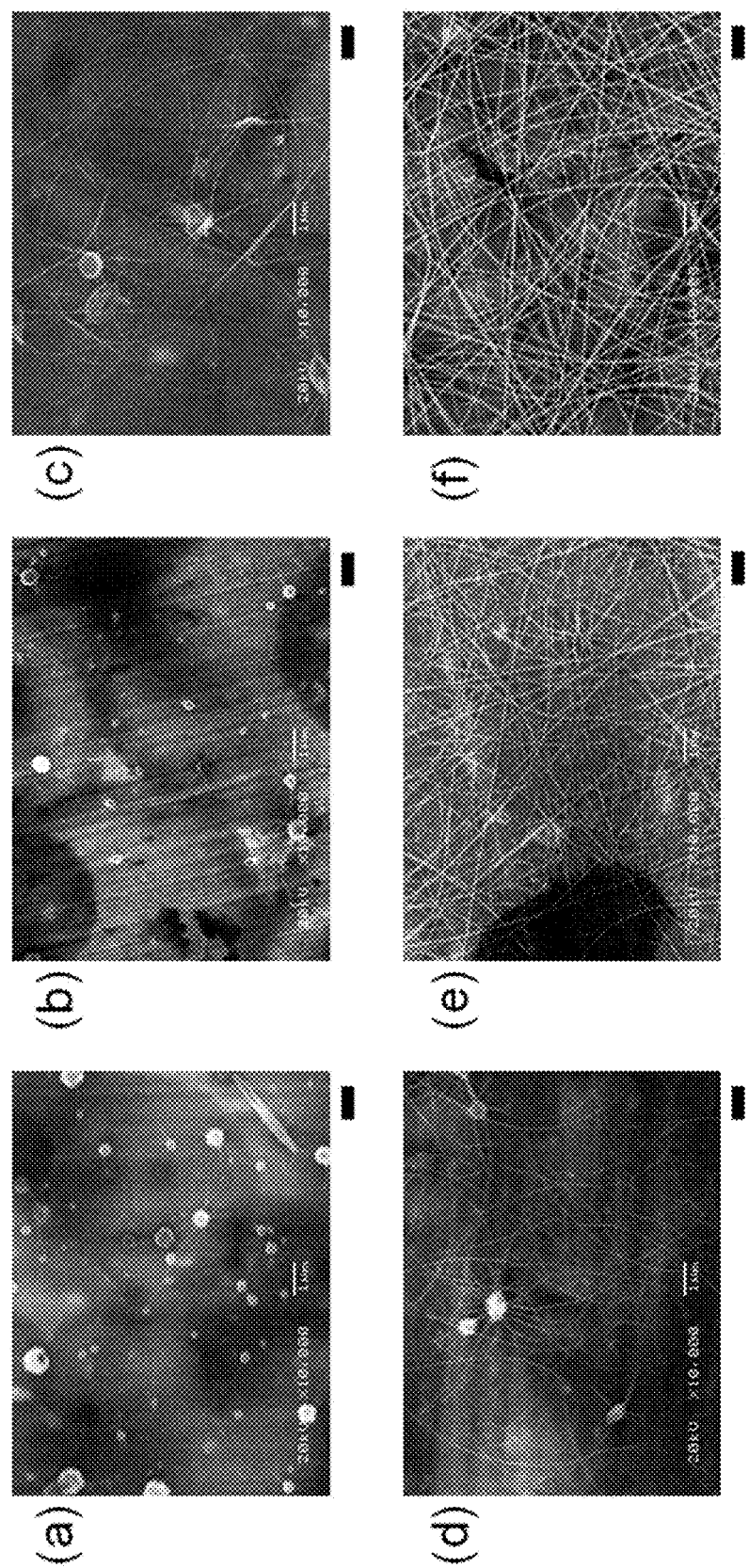
FIG. 10 Photographs showing the results of spinning conducted when the applied voltage is −16 kV in Example 2. Solution concentration: (a) 3.0 mg/ml; (b) 4.0 mg/ml; (c) 5.0 mg/ml; (d) 6.0 mg/ml; (e) 8.0 mg/ml; (f) 10.0 mg/ml.

The results of spinning conducted when the applied voltage was −16 kV and constant and the solution concentration was changed in the range of from 3.0 to 10.0 mg/ml are shown in FIG. 10. The feeding rate and the spinning distance were 3.0 ml/h and 50 mm, respectively. As the solution concentration was increased, the deposited material was changed from a particulate form to a fibrous form as seen in the case where a positive voltage was applied, and, when the solution concentration was 8.0 mg/ml or more, only a fiber containing no bead and no particulate deposited material was formed. The fiber obtained when the solution concentration was 8.0 mg/ml had an average diameter of 78 nm and a standard deviation of 20 nm. The fiber obtained when the solution concentration was 10.0 mg/ml had an average diameter of 77 nm and a standard deviation of 16 nm.

Figure 11:
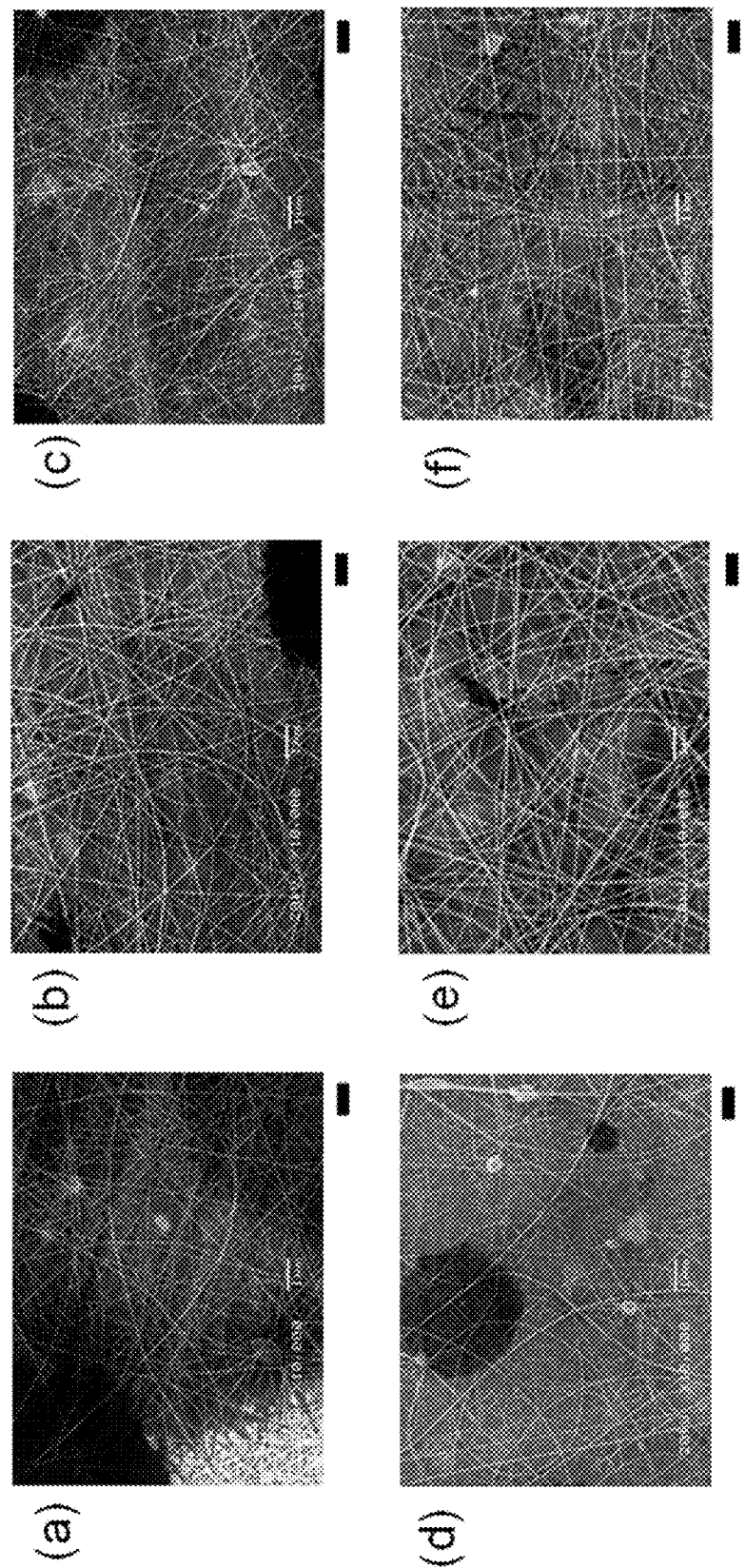
FIG. 11 Photographs showing the results of spinning conducted when the solution concentration is 8.0 mg/ml {(a) to (d)} and when the solution concentration is 10.0 mg/ml {(e) and (f)} in Example 2. Applied voltage: (a) −12 kV; (b) −14 kV; (c) −18 kV; (d) −20 kV; (e) −16 kV; (f) −20 kV.

Then, using the same chitosan having a viscosity-average molecular weight of 1,000,000 g/mol and a deacetylation degree of 80 to 90%, the effect of the applied voltage on the formation of fiber was examined. The results of spinning conducted when the solution concentration was 8.0 mg/ml and constant and the applied voltage was changed in the range of from −12 to −20 kV, and the results of spinning conducted when the solution concentration was 10.0 mg/ml and constant and the applied voltage was changed in the range of from −16 to −20 kV are shown in FIG. 11. The feeding rate and the spinning distance were 3.0 ml/h and 50 mm, respectively. With respect to the solution concentration of 8.0 mg/ml, when the applied voltage was from −14 to −16 kV, a non-defective fiber was obtained, and, when the applied voltage was outside the above range, a bead fiber was formed. The fiber obtained when the applied voltage was −14 kV had an average diameter of 73 nm and a standard deviation of 9 nm. With respect to the solution concentration of 10.0 mg/ml, when the applied voltage was from −16 to −20 kV, a non-defective fiber was formed. The fiber obtained when the applied voltage was −16 kV had an average diameter of 77 nm and a standard deviation of 16 nm, and the fiber obtained when the applied voltage was −20 kV had an average diameter of 75 nm and a standard deviation of 9 nm.

DESCRIPTION OF REFERENCE NUMERALS

1: Syringe pump
2: Needle
3: Electrode plate
4: High voltage generating apparatus
5: Multi-nozzle
6: Base plane
7: High-voltage cable

The invention claimed is:

1. A method for producing a polymer fiber by an electrospinning method which comprises applying a voltage to a solution of a polymer electrolyte to allow a jet of the solution to spurt, forming a polymer fiber, wherein the voltage applied to the solution of the polymer electrolyte to allow the solution to spurt is a voltage having an opposite polarity to a charge of molecular chains of the polymer electrolyte in the solution.

2. The method for producing a polymer fiber according to claim 1, wherein the polymer electrolyte is at least of one naturally derived polymer selected from the group consisting of chitosan, hyaluronic acid, polyglutamic acid, nucleic acid, polypeptide, protein, cellulose, and derivatives thereof.

3. The method for producing a polymer fiber according to claim 1, wherein the polymer electrolyte is at least one synthetic polymer selected from the group consisting of polyacrylamide, polyacrylic acid, polystyrenesulfonic acid, polyallylamine, and polyethylene-imine.

4. The method for producing a polymer fiber according to claim 1, wherein the polymer electrolyte is a blend or a mixture having as a component, at least one polymer electrolyte selected from naturally derived polymers and synthetic polymers, wherein the naturally derived polymers are at least one selected from the group consisting of chitosan, hyaluronic acid, polyglutamic acid, nucleic acid, polypeptide, protein, cellulose, and derivatives thereof, and
the synthetic polymers are at least one selective from the group consisting of polyacrylamide, polyacrylic acid, polystyrenesulfonic acid, polyallylamine, and polyethylene-imine.

* * * * *